(12) United States Patent
Yokota

(10) Patent No.: US 7,969,424 B2
(45) Date of Patent: Jun. 28, 2011

(54) ELECTRONIC DEVICE, RECORDING MEDIUM AND METHOD

(75) Inventor: Ryutaro Yokota, Osaka (JP)

(73) Assignee: Kyocera Mita Corporation, Chuo-ku, Osaka-shi, Osaka (JP)

( * ) Notice: Subject to any disclaimer, the term of this patent is extended or adjusted under 35 U.S.C. 154(b) by 914 days.

(21) Appl. No.: 11/827,204

(22) Filed: Jul. 11, 2007

(65) Prior Publication Data

US 2008/0012836 A1      Jan. 17, 2008

(30) Foreign Application Priority Data

Jul. 11, 2006   (JP) .................................. 2006-190454

(51) Int. Cl.
*G06F 3/041* (2006.01)
(52) U.S. Cl. ..................... 345/173; 345/156; 178/18.01; 178/18.02; 178/18.05; 178/18.06; 178/18.07
(58) Field of Classification Search .......... 345/156–173; 178/18.01–20.04
See application file for complete search history.

(56) References Cited

U.S. PATENT DOCUMENTS

| 5,790,114 A * | 8/1998 | Geaghan et al. | 715/763 |
| 6,323,846 B1 * | 11/2001 | Westerman et al. | 345/173 |
| 7,312,791 B2 * | 12/2007 | Hoshino et al. | 345/173 |
| 7,821,501 B2 * | 10/2010 | Felder | 345/173 |

FOREIGN PATENT DOCUMENTS

| JP | 8 137342 | 5/1996 |
| JP | 2000-20200 | 1/2000 |

* cited by examiner

*Primary Examiner* — Richard Hjerpe
*Assistant Examiner* — Jeffrey Steinberg

(57) ABSTRACT

Methods, computer program products, computing and printing systems for improved screen display and touch input, where an operation/display unit comprises a screen display unit such as a LCD; a touch location detection unit, which is a touch panel that accepts a user's touch operation; a touch decision unit that determines the touch location of the user's touch operation to the touch panel; and a touch execution unit that executes functions according to the user's touch location. If the user's touch location is within the effective area(s) of the operation button(s), then the touch execution unit executes the function allocated to the operation button(s). If the touch location is outside of the effective area(s) of the operation button(s), then the region outside of the operation button(s) is displayed as grayed-out.

17 Claims, 5 Drawing Sheets

ELECTRONIC DEVICE, RECORDING MEDIUM AND METHOD

FIELD OF THE INVENTION

The present invention relates to an electronic device, recording medium and method for displaying an operation button and other images on a display screen on the device to allow the user to enable operations by the user's touching of the operation button as an image.

BACKGROUND OF THE INVENTION

A touch-panel interface accompanying a device typically displays a button area on a LCD (Liquid Crystal Display) and enables operations by the user's touching of the button area. A problem of this type of touch-panel user interface is that the user has a difficulty in identifying the location of a button since the "button" is a mere two-dimensional image displayed on the panel, rather than a physical button. Furthermore, lately along with multi-functionalization of the device and further complication of operation, a design and layout of the window/screen has become more crowded with data and multiple buttons. The foregoing factors contributes to the user's difficulty in operating such a device, where the user has trouble in intuitively finding the target operation buttons that are randomly or haphazardly arranged on the screen.

SUMMARY OF THE INVENTION

According to one aspect of the present invention, an electric device forms on the screen effective areas to display a button and other operation data thereon, and displays them while distinguishing the effective areas from the other ineffective areas. If the user touch-operates the ineffective area unrelated to the effective areas, the device changes on the screen the relative relationship between screen display modes of the effective areas and the other ineffective areas.

These and other objects, features, and advantages of the present invention will become more apparent upon reading of the following detailed description along with the accompanied drawings.

DETAILED DESCRIPTION OF THE INVENTION

Exemplary embodiments of the present invention are explained below with reference to the accompanying drawings, though these embodiments are not intended to limit the invention. The application of the present invention is not limited to the image forming units of the following descriptions. Additionally, in some instances, well-known structures, interfaces, and processes have not been shown in detail in order not to unnecessarily obscure the present invention.

Figure 1:
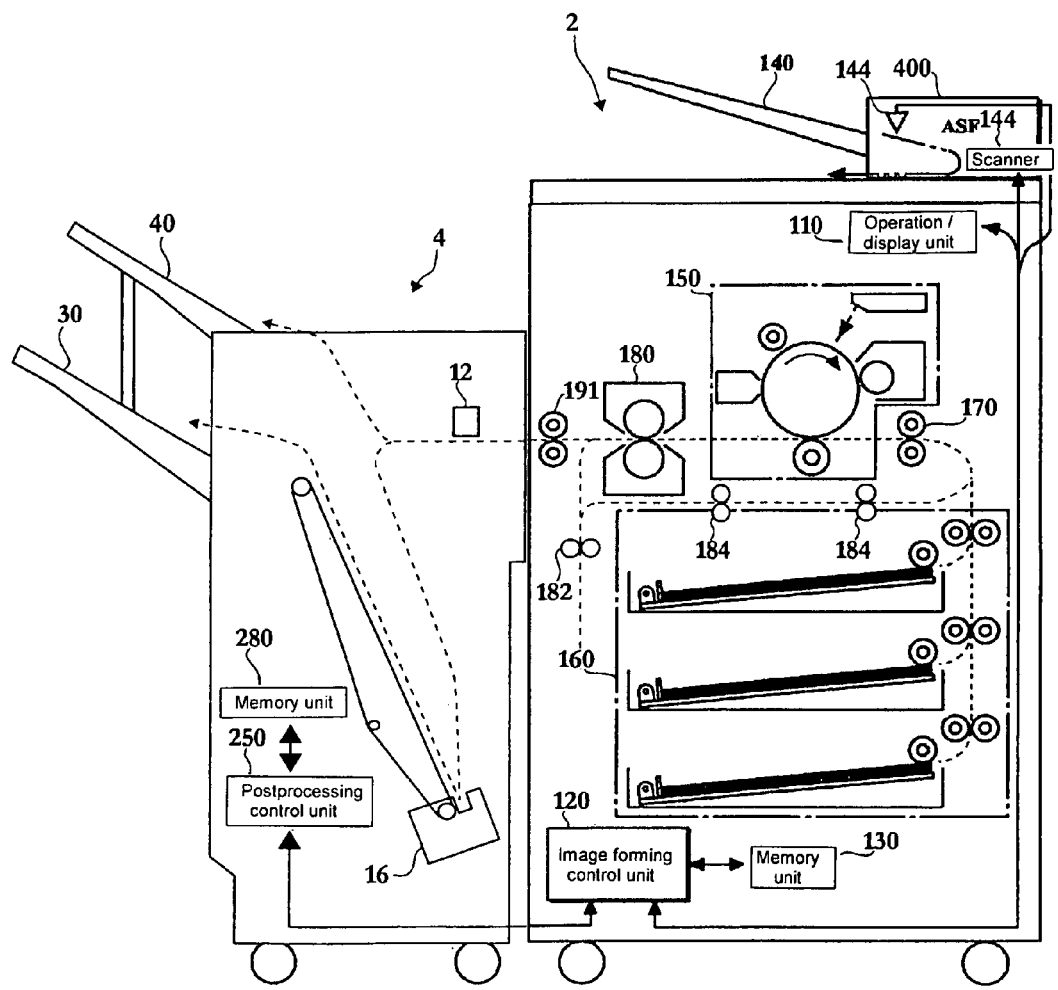
FIG. 1 is a diagram illustrating a configuration of an image forming unit according to a preferred embodiment of the present invention.

FIG. 1 is a diagram illustrating schematic configuration of an image forming unit 2. A postprocessing unit 4 is attached to the image forming unit 2, adjacent to the side to which a paper is ejected. The following describes a basic configuration of the image forming unit 2 and the postprocessing unit 4.

As shown in FIG. 1, the image forming unit 2 is installed with an image forming control unit, and the postprocessing unit 4 is installed with a postprocessing control unit 250. Configurations of the control units 120 and 250 include an electronic circuit with a CPU (Central Processing Unit). The electronic circuit is formed and installed on a circuit base board. The CPU is individually installed on the image forming unit 2 and the postprocessing unit 4. Additionally, the image forming control unit 120 is connected with a memory unit 130, and the postprocessing control unit 250 is connected with a memory unit 280. The memory units 130 and 280 are comprised of memory such as a ROM (Read-Only Memory), a RAM (Random Access Memory), and/or a HDD (Hard Disk Drive).

The image forming unit 2 stores to the memory unit 130 through the image forming control unit 120 data configured through operation at an operation/display 110. The configuration items include paper size and type, paper feeding direction and orientation, manuscript density, frame deletion, stapling, N-up, etc. and image processing is performed according to each configuration. The image forming unit 2 requires various image processing time period depending on the configuration item. The memory unit 130 connected the image forming control unit 120 stores an application program for an MFP with a multiple-thread-processing capability.

For example, in an image processing including copying a document, the user place the document paper on a paper tray 140 of an auto-sheet feeder 400 and presses a start button (not shown) of the operation/display unit 110. The following processing will be performed according to the operation. If a paper censor 143 installed on the auto-sheet feeder 400 detects the document paper, the auto-sheet feeder 400 transmits and ejects each document paper while a scanner 144 scans the document image. The scanned image data will be stored through the image forming control unit 120 to the memory unit 130 for each job.

The image forming control unit 120 pre-processes the image data, for example, removes noise of the image/data, then performs an image processing on the image according to the each configuration to provide the data to a printer engine 150 for each page. Accordingly, a latent image will be formed on a surface of a photo conductive drum of the printer engine 150 to be developed with a toner.

In the meantime, inside the image forming unit 2, a paper extracted from a paper feeding unit 160 is transmitted to a paper stop roller 170 and held thereat momentarily. Upon the photo conductive drum of the print engine 150 reaching a certain turning angle, at this time, the paper stop roller 170 restarts transporting the paper and the toner image will be transferred onto the paper. The paper passes through a fuser unit 180 to be heated and pressured, and thereby the toner image will be fused and fixed onto the paper. The paper with the transferred toner image will now be a transfer paper. The transfer paper will be ejected through a pair of ejection rollers 191, then handed to the postprocessing device 4.

The image forming unit 2 can print an image on the both sides of a paper. A pair of paper reversion rollers 182 are installed below the fuser unit 180, in the downstream direction of paper transfer and transportation. A pair of rollers 184 for duplex (both-side) printing are allocated and installed between the printer engine 150 and the paper feeding unit 160. The layout of the paper reversion rollers 182 and duplex printing rollers 184 form a paper transportation path for both-side printing.

In both-side printing with the image forming unit 2, the transfer paper is guided to switch and take a downward path just before a pair of ejection rollers 191 after passing through the fuser unit 180. Then, the transfer paper is transported downward into the paper reversion rollers 182. The paper reversion rollers 182 receive and transport the paper further downward until the end of the paper reaches the rollers 182. As soon as the paper reaches them, the paper will be quickly reverse-transported. The paper transported upward makes a quick right turn in FIG. 1 from below the fuser 180 and will be transported through the duplex printing rollers 184. Then, the paper will be once again transmitted to paper stop rollers 170 to be further transmitted to the printer engine 150 while the printing timing is synchronized for printing of the other side of the paper.

Figure 2:
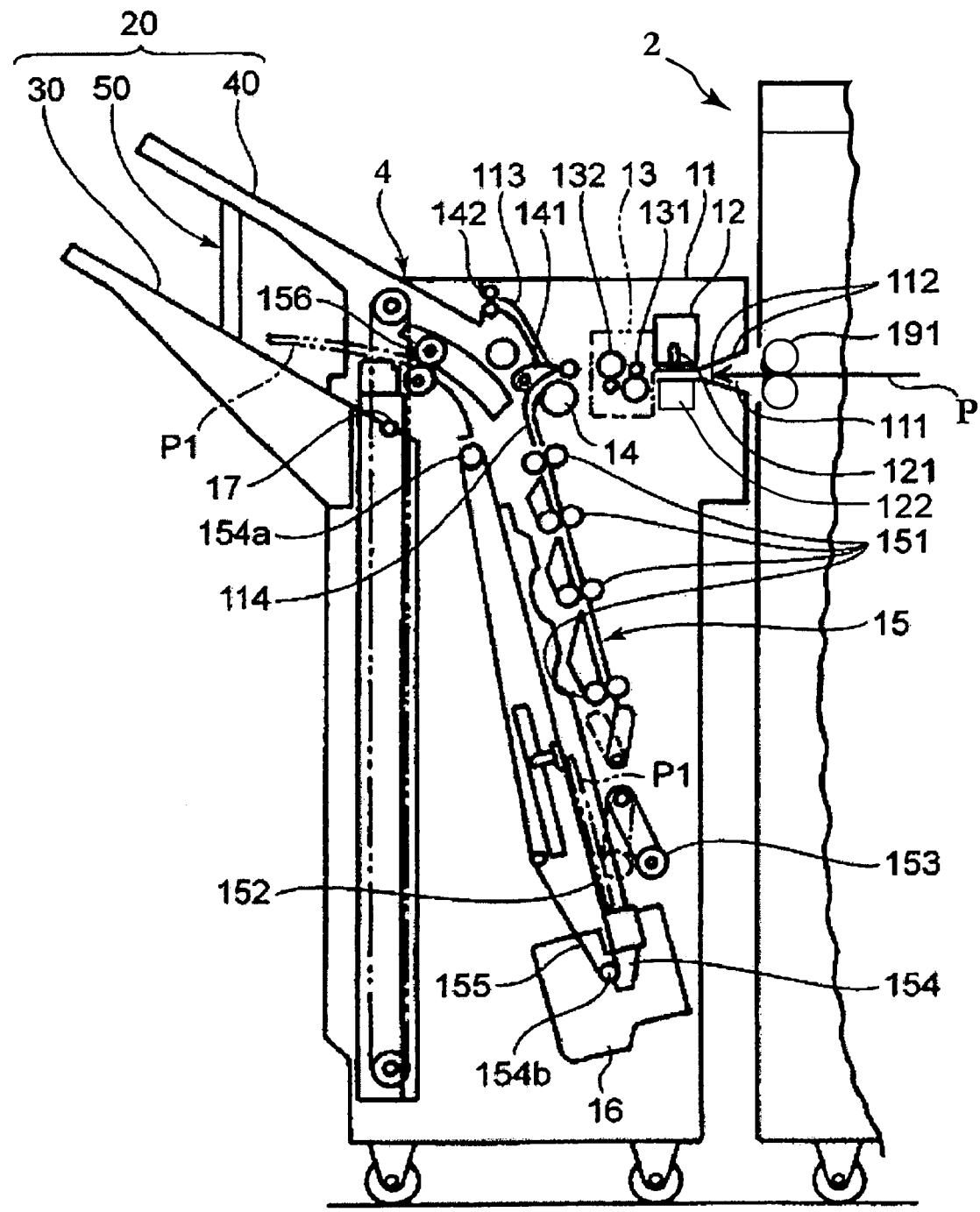
FIG. 2 is a frontal cross-section view illustrating the inner configuration of the postprocessing unit, according to an embodiment of the present invention.

FIG. 2 is a diagram illustrating a frontal cross-section view of an inner configuration of the postprocessing unit 4. As shown in FIG. 2, the postprocessing unit 4 is for making holes for filing (punch processing), and for stapling a temporarily-stocked transfer paper bundle P1 with staples (staple processing). The transfer paper P, which has been thus punched or stapled, will then be ejected from the postprocessing unit 4 as postprocessed paper.

The postprocessing unit 4 is comprised of a truncated rectangular parallelepiped shaped housing (unit body) 11. The housing 11 forms a paper insert slot 111 facing the paper ejection rollers 191 of the image forming unit 2. Moreover, a paper output unit 20 is installed on the other side from the paper insert slot 111 of housing 11 for receiving the transfer paper P which is output from the postprocessing unit 4.

The output unit 20 includes two upper and lower trays placed parallel to each other. In a preferred embodiment of the present invention, the bottom tray is a main tray 30, and the top one is a sub-tray 40. The papers P1 will be output to the main tray 30 after staple processing being applied to. A staple processing is performed when an output mode of the postprocessing unit 4 is set to a staple mode. When the staple mode is specified, the postprocessing unit 4 temporally stores and holds the papers P1 at a center part of the housing 1 to perform the staple processing. After the processing, the postprocessing unit 4 outputs the papers P1 to the main tray 30. On the other hand, each sheet of transfer paper P is output to the sub-tray 40 without staple processing being applied to. Provided between the main tray 30 and the sub-tray 40 is an installed matching material 50 for matching and arranging the papers P1 on the main tray 30. Each of the trays 30 and 40 are installed to point upward from the output window in the output direction. The output modes specified at the postprocessing unit 4 includes, in addition to the staple mode, non-staple mode, sorting mode, non-sorting mode, etc.

In any mode, the transfer paper P output from the ejection rollers 191 of the image forming unit 2 is introduced into the postprocessing unit 4. A punching-hole processing and a staple processing are applied to the transfer paper P thereat to be output to the main tray 30 or the sub-tray 40 depending on the applied processing. The transfer paper P includes standard paper, tracing paper, OHP sheet, and other sheet form of recording media.

The paper insert slot 111 is installed with a pair of top and bottom guide boards 112. The guide boards 112 are installed in a way to taper into the direction of the transfer paper P being output. For the punching hole processing, a punching machine 12 is installed at the position adjacent to the paper insert slot 111. The transfer paper P output from the ejection rollers 191 is guided by the guide boards 112 to be transport under and to the punching machine 12.

The punching machine 12 has, for example, a pair of punch rods 121 for punching a hole or holes. Each of the punch rods 121 is installed vertically to the output direction of the transfer paper P in a particular distance from each other (for example, the distance specified for two-hole punching). Upon delivery of the transfer paper P, the punching machine 12 halts the transfer paper P at the front end or edge by a stopper (not shown). At that point, the punching machine 12 drops the punch rods 121 onto the transfer paper P to punch a hole on the given location. The punch rods 121 penetrate the transfer paper P, and are inserted into the punch hole receptor holes provided in the base that is further below. Below the punching machine 12 is a punch waste receptacle 122, which stores the punch wastes (the portion created by punching). When the punching processing is thus completed, the stopper of the punching machine 12 is retracted. The transfer paper P is then transported to an uncurling unit 13 by activation of the ejection rollers 191.

The uncurling unit 13 removes curling or warping of the transfer paper P produced thereon by heat generated by the image forming unit 2 through the fusing processing. The uncurling unit 13 is configured with two sets of curl removal rollers 131 and 132. The curl removal rollers 131 and 132 remove the curls formed in the opposite directions from each other to restore the transfer paper P to the flat state. The paper curling direction differs depending on the condition of the image formation on the transfer paper P, such as whether an image is copied on to one side or both sides. If the image forming unit 2 can perform both-side printing, the paper correction for the both directions will be most effective.

A pair of transfer rollers 14 is installed in the housing 11 in the direction of the paper being transported to just after the uncurling unit 13. The transfer rollers 14 include one large roller and one small roller. Further down in the paper transportation direction, a first paper transfer path 113 and a second paper transfer path 114 are installed. The first paper transfer path 113 stretches out diagonally upward to the sub-tray 40 while the second paper transfer path 114 reaches diagonally downward away from the sub-tray 40. The two paths split in the opposite directions at the transfer rollers 14. The split point has a separating clutch 141 which switches the transfer path of the transfer paper P between the first paper transfer path 113 and the second paper transfer path 114. More specifically, if the separating clutch 141 closes the path to the second paper transfer path 114, the path to the first paper transfer path 113 opens. The transfer paper P transported and output from the transfer rollers 14 will be guided by the separating clutch 141 and the first paper transfer path 113 to be transported to a nip unit of the output rollers 142 for the sub-tray 40. The transfer paper P the will be output to the sub-tray 40 by activation of the output rollers 142. If the separating clutch 141 closes the path to the first paper transfer path 113, the second paper transfer path 114 opens. The transfer paper P output from the transfer rollers 14 will be guided by the separating clutch 141 and the second paper transfer path 114 to be delivered to a middle tray 15.

On the second paper transfer path 114 are four paper introduction units 151 sequentially placed along with the path. The transfer paper P will be guided to a paper reception table 152 of the middle tray 15 by the paper introduction units 151 through a different path depending on the size of the paper.

The paper reception table 152 is configured to store multiple pages of the transfer paper P (for example, 20 pages for the standard paper). The transfer paper P transmit to the paper reception table 152 will be sent further downward by a pressure bearing 153 to come to a halt at a location determined by a receptor unit 154. In one-side printing, the transfer paper P transported through the second paper transfer path 114 will be placed by the receptor unit 154 under the previous transfer paper P in such that the new paper P will face the back page of the previous paper P. Accordingly, a plurality of the transfer papers P are neatly arranged at the edges to form a paper bundle P1 on the paper reception table 152, and the staple processing will be applied to the paper bundle P1 by a stapler 16.

A driving pulley 154a is installed near the top of the second paper transfer path 114, which is the topmost part of the paper reception table 152. A secondary pulley 154b is installed near the bottom of the second paper transfer path 114, the lowest part of the paper reception table 152. An endless belt 155 is installed wrapping around the pulleys 154a and 154b, and the receptor unit 154 is mounted on the endless belt 155. Therefore, by turning the receptor unit 154 after application of the staple processing to the paper bundle P1, the paper bundle P1 supported by the receptor unit 154 will be lifted upward and transported to the nip unit of the output rollers 156 for the main tray 30. The paper bundle P1 then will be output to the main tray 30 by driving activation of the output rollers 156.

The main tray 30 is configured to be adjustable in height, by moving upward and downward along the side surface of the postprocessing unit 4. At the postprocessing unit 4, a censor 17 detects the surface level of the main tray 30 and controls it to be the optimal level for accumulating the paper bundle P1. Thus, even if a large volume of the transfer paper P is output to the main tray 30, the output paper bundle P1 will be output without being hindered by the output papers P1 accumulated on the main tray 30.

The matching material 50 is installed between the main tray 30 and the sub-tray 40 in order to match and arrange the front ends within the paper bundle P1 output to the main tray 30. The matching material 50 applies the matching processing on the paper bundle P1 and solves the problems related to the disarray within the paper bundle P1, which is output to the main tray 30 through the output rollers 156 from the paper reception table 152 by activation of the endless belt 155. Thus the paper bundle P1 will be automatically sorted out without disorderly accumulated.

As described, the postprocessing unit 4 performs processing of after transferring an image on the transfer paper P, such as the punching and the staple processing. The user can configure for each job for applying the postprocessing, such as punching and stapling, by operating an operation/display unit 110 of the image forming unit 2.

In other words, if a user who is requesting holes in the transfer paper P for filing in the job to be executed, the user can operate an operation/display unit 110 to carry out the specific operation (button operation, touch operation, etc.) to specify the settings for the punch processing by the postprocessing unit 4.

If a user who is requesting stapling of the bundled transfer paper P in the job to be executed, the user can operate an operation/display unit 110 to carry out the specific operation (button operation, touch operation, etc.) to specify the settings for the staple processing by the postprocessing unit 4. The user can furthermore specify both punch and staple processing in the job to be executed.

If a user who is requesting duplex printing in the job to be executed, aside from postprocessing such as punching or stapling, the user can operate an operation/display unit 110 to carry out the specific operation (button operation, touch operation, etc.) to specify duplex printing for the job.

The content of a user's specification (specified values), for each job is received by the image forming control unit 120 of the image forming unit 2, and is temporarily stored in the memory unit 130. The image forming control unit 120 controls, according to the per-job specification settings, controls the driving mechanism of the print engine 150, ejection rollers 191, paper reversion rollers 182, duplex printing rollers 184, etc., as well as sends the operation directive signals to the postprocessing control unit 250. These operation directive signals includes, per-job paper type, paper size, number of copies to print, printing mode (single or double side), etc., as well as directive content regarding aforementioned punch and staple processing. The postprocessing control unit 250 controls the operation of the punch machine 12 and stapler 16 according to the received directive signals, and controls the operations of separating clutch 141, paper introduction units 151, driving pulley 154a, the up-and-down movement of the main tray 30, etc. Thus, by the user's specifying the postprocessing content for each job, the postprocessing units carry out the specific necessary operation and actions according to the user's specifications.

The basic configurations and functionalities of the image forming unit 2 and the postprocessing unit 4 have now been described. According to the preferred embodiments of the present invention, in particular, the image forming control unit 120 of the image forming unit 2 functions as a computer executing a stored program, and accordingly, the operation/display unit 110 operates as follows.

Figure 3:
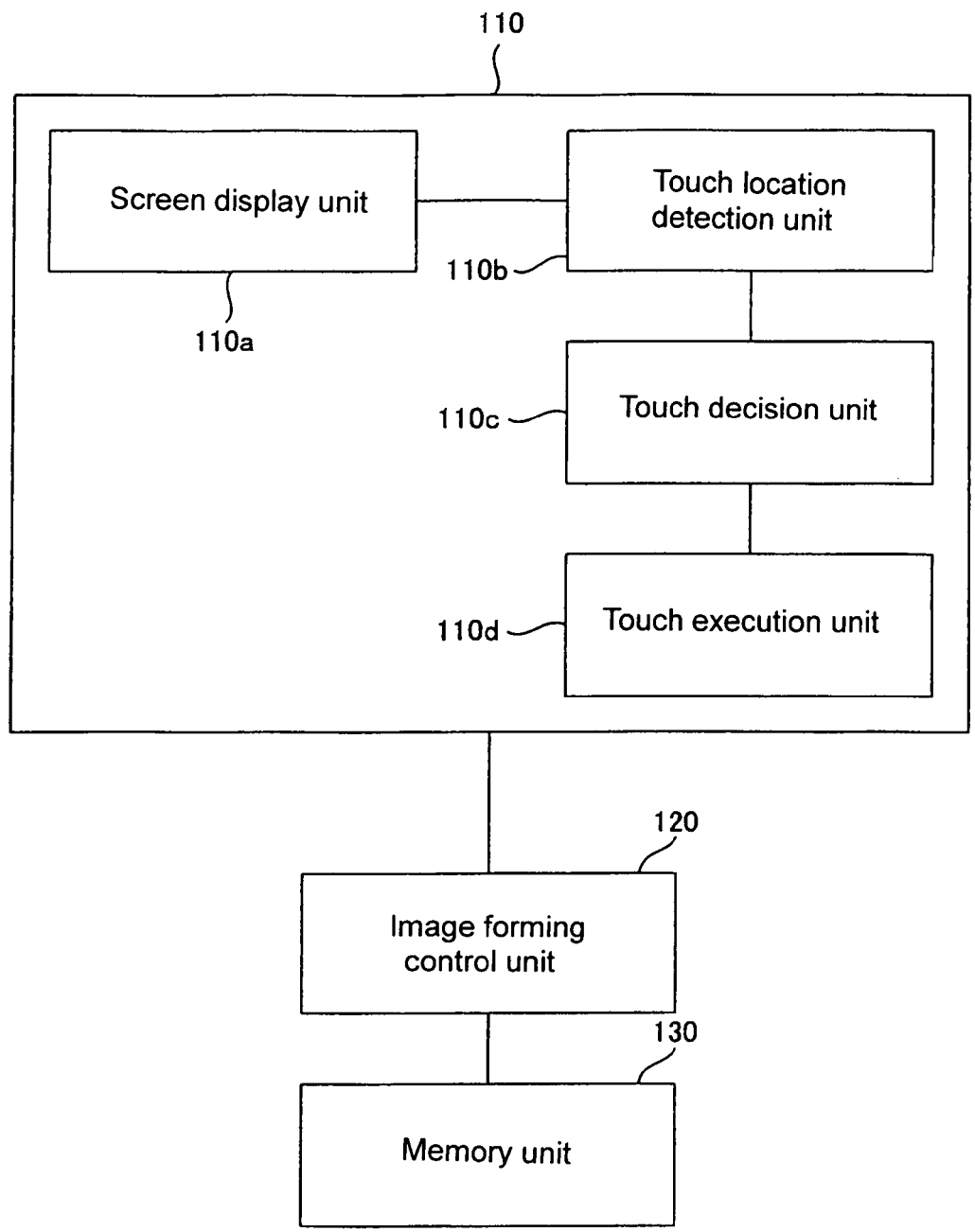
FIG. 3 is a block diagram illustrating the control of the operation/display unit, according to an embodiment of the present invention.

FIG. 3 is a block diagram illustrating the control of the operation/display unit 110. Configurations related to the control of the operation/display unit 110 included here are screen display unit 110a, touch location detection unit 110b, touch decision unit 110c, touch execution unit 110d, etc. Of these, screen display unit 110a is, for example, a unit comprising of a LCD and a driver therefor. The LCD is installed on the exterior cover surface of the image forming unit 2, where it is easy to see for the user.

A touch location detection unit 110b is a unit comprising of a touch panel (input device) and a driver therefor. A touch panel is installed to cover the surface of the display screen of the LCD. The driver carries out the detection operation according to the detection method of the touch panel (ultrasound, infrared, touch contact, etc.). The surface of the touch panel is virtually arranged with a two-dimensional coordinates (X-Y coordinates), and when there is a touch operation, the touch location detection unit 110b outputs the corresponding coordinate detection signals.

The touch decision unit 110c has the functionality of deciding and determining the user's touch operation location (coordinates) upon the screen display unit 110a, based on the coordinate detection signals from the touch location detection unit 110b. When the touch decision unit 110c determines the touch operation location, its coordinate data is notified to the touch execution unit 110d. The touch execution unit 110d analyzes the appropriate function corresponding to the touch operation based on the received coordinate data, and executes the operation of the function.

For example, assume that upper left of the screen display unit 110a displays an operation button indicated as "paper size," and for the operation button is registered a function of "display all selectable paper trays." In this case, if the touch decision unit 110c determines that effective area (coordinates) of the operation button indicated as "paper size" has been touched by the user, then accordingly, the touch execution unit 110*d* changes the display content of the screen display unit 110*a* and executes processing causing displaying of all selectable paper trays at the LCD. Note that these operations at the operation/display unit 110 are controlled by the image forming control unit 120.

Figure 4:
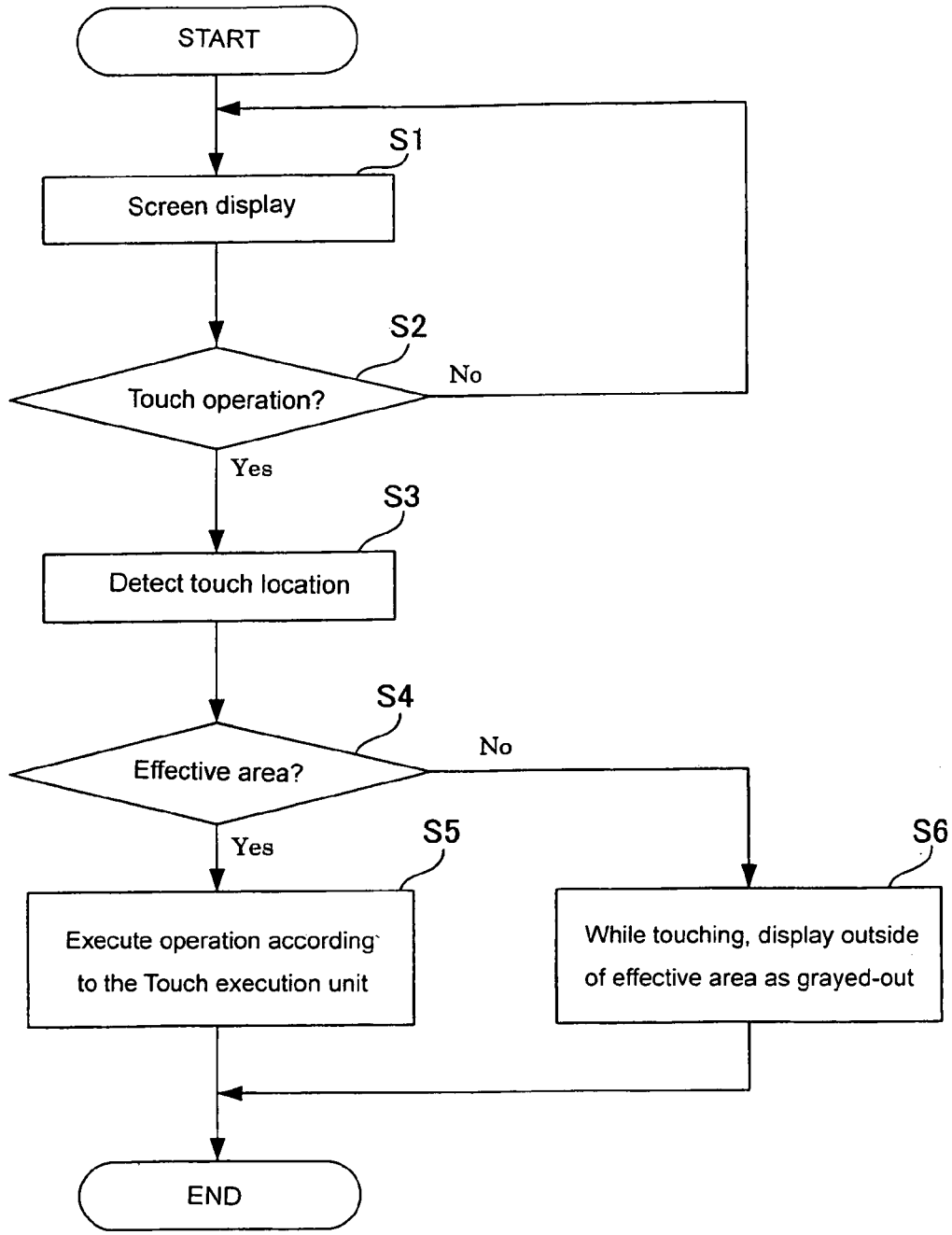
FIG. 4 is a flowchart illustrating the sample procedures of a program executed by the image forming control unit, according to an embodiment of the present invention.

FIG. 4 is a flowchart illustrating the sample procedures of a program executed by the image forming control unit 120, according to an embodiment of the present invention. The image forming control unit 120 (CPU) executes the program according to the flowchart's procedures. The details of the Step S1 through Step S5 will now be described in turn.

Step S1: The image forming control unit 120 through the screen display unit 110*a* executes screen display for the current status. For example, if the current status of the image forming unit 2 is "waiting," then the screen display unit 110*a* will show the initial screen comprising the various operation buttons that are appropriated laid-out and arranged. Here, "waiting" refers to the state of waiting for a job from a user, rather than executing a job. The image data that is to be actually displayed at this time is stored, for example in the ROM of the memory unit 130, and the image forming control unit 120 gives the driving signals to the driver of the screen display unit 110*a*, based on the image data read from the ROM.

Step S2: The image forming control unit 120 waits for the user's touch operation. If there is no touch operation from the user, the image forming control unit 120 repeats Step S1 and maintains the screen display.

Step S3: If a user executes a touch operation, the image forming control unit 120 detects the touch location (coordinates) at the time.

Step S4: Based on the touch location (coordinates) detected in the preceding Step S3, the image forming control unit 120 determines if an effective area (coordinates) of any operation button in the current display screen has been touched.

Step S5: The image forming control unit 120, if in the preceding Step S4 any effective area of an operation button is determined to be touched (Yes), executes the function based on information registered in the touch execution unit 110*d*. Thus, for the operation/display unit 110, the functions (paper size selection, updating display of menu screen, etc.) corresponding to the each operation button are executed.

Step S6: On the other hand, if in the preceding Step S4 any effective area of an operation button is not determined to be touched (No), the image forming control unit 120, through the screen display unit 110*a*, displays the region outside of the effective area as grayed-out while the touch operation is ongoing.

Figure 5:
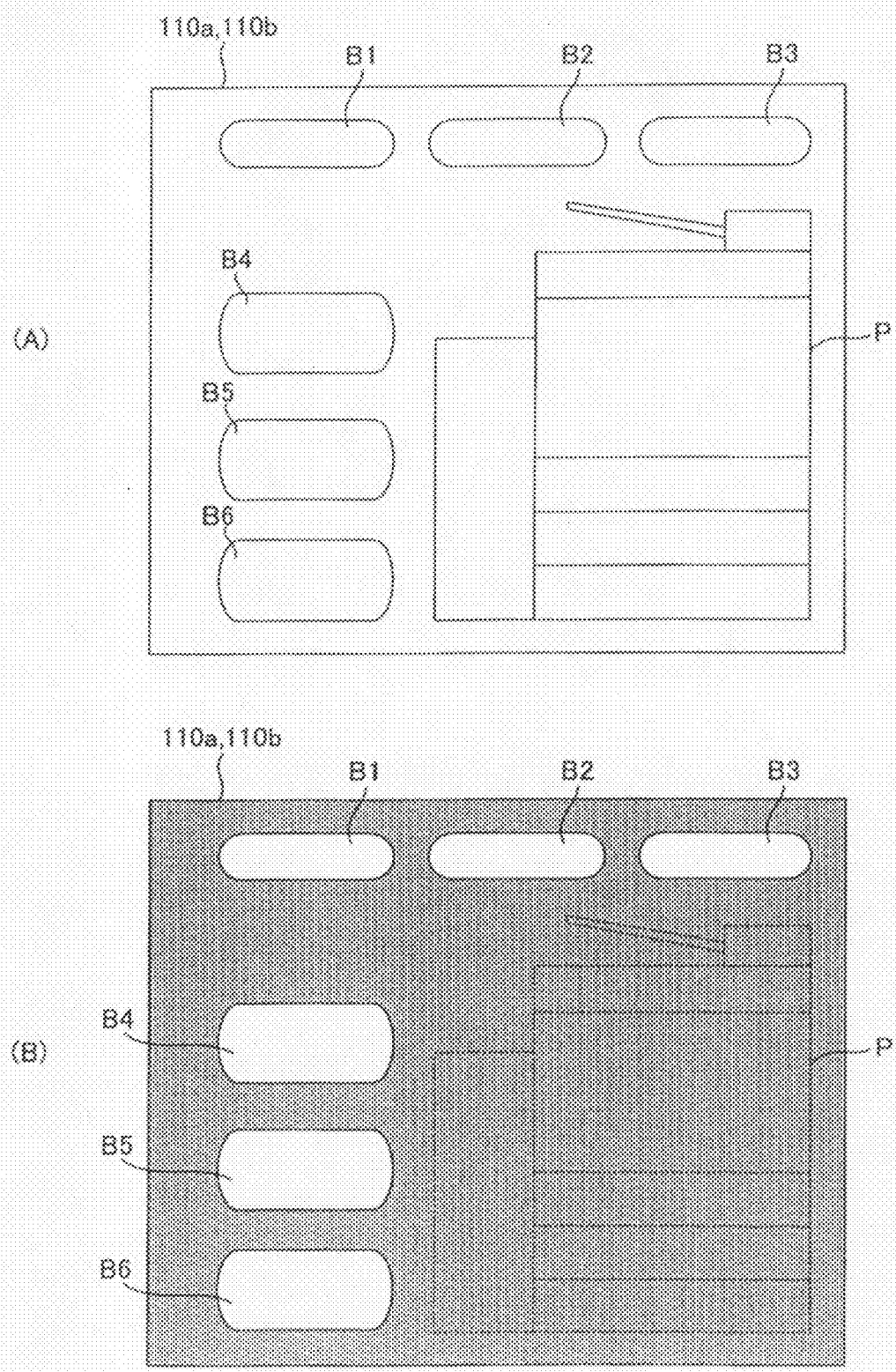
FIG. 5 is a flowchart illustrating the sample operations of the screen display unit that accompany the execution of the flowchart (program) of FIG. 4, according to an embodiment of the present invention.

FIG. 5 is a flowchart illustrating the sample operations of the screen display unit 100*a* that accompany the execution of the flowchart (program) of FIG. 4. If the current status of the image forming unit 2 is "waiting," then as shown in FIG. 5(A), the screen display unit 110*a* will show the initial screen comprising the various operation buttons B1-B5 that are appropriated laid-out and arranged. Not that, although not shown in the figure, within the display frames of the operation buttons B1-B5, also displayed for example are characters, pictures, and signs such as "paper size," "zoom ratio," "duplex printing," "punch holes," "stapling," "sorting," etc.

As shown in FIG. 5(A), the screen display unit 110*a* displays an information display image P in addition to the operation buttons B1-B5. The information display image P is comprised of pictorial images depicting the outlines of the image forming unit 2 and the postprocessing unit 4. The information display image P displays, for example, information such as out of paper or paper jam conditions at the paper feeding unit 160, or original document left on the contact glass, each according to the location corresponding to the condition.

In any case, for the example shown in the screen display in FIG. 5(A), a user's touch operation is only effective within the display frames of the operation buttons B1-B5. If the user performs a touch operation on the effective areas of any of the operation buttons B1-B5, the image forming control unit 120 executes the Step S5 to execute the functions corresponding to the operation buttons B1-B5.

On the other hand, if the user performs a touch operation on a region outside the display of operation buttons B1-B5, the functions corresponding to the operation buttons B1-B5 are not executed. Instead, in an embodiment of the present invention, as shown in FIG. 5(A), the region outside the display (effective areas) of the operation buttons B1-B5 is displayed as grayed-out (Step S6). Thus, as a contrast with the grayed-out display, the brightness or prominence of the display of the operation buttons B1-B5 becomes relatively more heightened, and displayed with more accentuation, resulting in an improved visibility for the user.

Accordingly, even if the user is unable to fully recognize the existence of the operation buttons B1-B5 upon glancing FIG. 5(A), by the user casually or aimlessly touching any portion of the screen display unit 110*a* and if the touching is on a region outside the display of operation buttons B1-B5, the above-described grayed-out display heightens and accentuates the existence of the operation buttons B1-B5. Thereafter, the user can touch any of the operation buttons B1-B5 to specify the functions corresponding to the operation buttons B1-B5.

Heretofore described are methods involving relatively accentuating the operation buttons B1-B5 by grayed-out display (decreasing brightness) of the ineffective areas. However, it is also possible to accomplish variously accentuated display by using the relative relationship between the operation buttons B1-B5 (effective areas) and the regions outside of the frames (ineffective areas) within the screen display unit 110*a*. List below are some examples.

(1) Display mode to accentuate the operation buttons B1-B5. By changing the display mode of the operation buttons B1-B5 within their display frame, the regions of the operation buttons B1-B5 are accentuated, compared to the display mode of the initial screen. Sample methods for accentuating the display of the operation buttons B1-B5 include inverted display, highlighted display to change (increase) the hue, brightness, and saturation, or changing the color tone to change (increase) the hue, brightness, and saturation. The operation buttons B1-B5 can also be made to blink, or an animation can be used to change the display mode to accomplish accentuated display. Such accentuated display can be performed on all regions of the operation buttons B1-B5 (effective area) or only on a portion thereof. For example, only the edges (frames) of the operation buttons B1-B5 can be subject to accentuated display or only the characters of the operation buttons B1-B5 can be subject to accentuated display. Here, accentuated display of the frames and character portions can involve changing (increasing) the hue, brightness, and saturation, or it can involve making the frames thicker or making the characters bold font.

(2) Display mode to obscure the ineffective areas. In addition to the aforementioned grayed-out display, obscuring (making less visible or prominent) the ineffective areas compared to the display mode of the initial screen, by changing the display mode of the ineffective areas (by lowering brightness or hue, changing the color tone, etc.).

(3) Combination of the display modes of (1) and (2). By changing the display mode of the operation buttons B1-B5 within the display frames, and at the same time, changing the display mode of the ineffective area, the operation buttons B1-B5 can be accentuated and ineffective areas obscured, compared to the display mode of the initial screen.

Regardless of the exact method used, within the screen display unit 110a, the operation buttons B1-B5 (effective areas) becomes accentuated so that the user can more easily recognize visibly the existence of the operation buttons B1-B5 to perform the next touch operation.

In an embodiment of the present invention, at the stage of the initial screen, the operation buttons B1-B5 are simply identified by frames to avoid impairing the operability of the user. Then, if the user performs a touch operation on an ineffective area, the regions of the operation buttons B1-B5 become accentuated (such as by heightened color tone, continuously blinking, etc.) to increase the visible identifiability, to assist the next touch operation by the user.

The actual arrangement of the operation buttons B1-B5 is not limited to that shown in FIG. 5. In an embodiment of the present invention, even if the operation buttons B1-B5 are not arranged to be particularly prominent within the initial screen conditions, if the user touches on an ineffective area, the operation buttons B1-B5 become accentuated to make their locations more visibly recognizable to the user. Thus, the layout of the operation buttons B1-B5 can be freely rearranged without being limited by the previous arrangement(s), which results in the overall design improvement of the operation/display unit 110.

In the flowchart of FIG. 4, the accentuated display of the operation buttons B1-B5 is to be carried out while the user is touching the ineffective areas (Step S6). It is possible to add a step following the Step S6 to count a timer, whereby a program incorporates procedures that for a specified period of time (for example, for 1 or 2 seconds) the control loops back to and repeats Step S6. This would result in the continuation of the accentuated display after the user has stopped touching the ineffective areas for a period of time (for example, for 1 or 2 seconds), making it easier for the user to proceed to the next operation.

In an embodiment of the present invention, the Step S6 results in a uniform, accentuated display of all of the operation buttons B1-B5. It is also possible to have an accentuated display of only the subset of the operation buttons that are valid or effective in that context. Thus, the user is not distracted by the unrelated operation buttons, resulting in improved operability.

In an embodiment of the present invention, the frequency table of each user's touch operations for each of the operation buttons B1-B5 is stored in the memory unit 130, and the relatively frequently used operation buttons become subject to an accentuated display with increased priority. Thus, the user is not distracted by the relatively unused operation buttons, resulting in improved operability.

The present invention is applicable to various electronic devices, not limited to any of the specific embodiments. In addition to the image forming unit 2, described in the preferred embodiments of the present invention, the present invention is applicable to other electronic devices that accept operations through a touch panel, such as a personal computer, automatic ticket selling machines, automatic vending machines, automated teller machines (ATM), etc. The present invention is also applicable to other devices involving remote control, wherein signals for the operations are transmitted to the main unit, which performs the corresponding actions for the operations.

Various components, units, and driving elements described and presented in the specific embodiments of the present invention are only samples for description and presentation, and they can be altered or modified as appropriate in applying the principles of the present invention.

The present document incorporates by reference the contents of Japanese priority document, Japanese Patent Application No. 2006-190454, filed in Japan on Jul. 11, 2006.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. An electronic device, comprising:
   a screen display unit that has a screen, displays operation information on a user's operations in at least one effective area within the screen, and distinguishes the at least one effective area from at least one ineffective area within the screen;
   a touch input unit that accepts the user's tactile touch operation upon a screen of the screen display unit;
   a touch location detection unit that detects the touch location of the touch operation within the screen, upon acceptance of a touch operation through the touch input unit;
   a display mode change unit that changes relative visibility of the display mode of the at least one effective area and the display mode of the at least one ineffective area within the screen, if the touch location detected by the touch location detection unit is determined to be corresponding to the at least one ineffective area within the screen; and
   a frequency table in a memory unit,
   wherein each of the user's tactile touch operation upon the screen of the screen display unit is stored in the frequency table in the memory unit, and
   wherein the display mode change unit changing relative visibility of the display mode of the at least one effective area and the display mode of the at least one ineffective area comprises at least one effective area and the operation information displayed in the at least one effective area corresponding to relatively frequently used operations for the user becoming subject to an accentuated display with increased priority.

2. The electronic device of claim 1, further comprising a function execution unit that executes the function based on an operation information displayed in the at least one effective area, if the touch location detected by the touch location detection unit is determined to be corresponding to the at least one effective area within the screen.

3. The electronic device of claim 1, wherein the display mode change unit displays the at least one effective area more prominently than the at least one ineffective area within the screen by changing a display mode of at least either one of the at least one effective area and the at least one ineffective area.

4. The electronic device of claim 3, wherein the display mode change unit changes the display mode of the at least one ineffective area by lowering the brightness and/or saturation of the at least one ineffective area.

5. The electronic device of claim 3, wherein the display mode change unit changes the display mode of the at least one effective area by heightening the brightness and/or saturation of the at least one effective area.

6. The electronic device of claim 1, wherein, upon determining the touch location detected by the touch location detection unit is corresponding to the at least one ineffective area within the screen, the display mode change unit changes relative visibility of the display mode of the at least one effective area and the display mode of the at least one ineffective area during the period while the touch operation is continuing.

7. The electronic device of claim 1, wherein, upon determining the touch location detected by the touch location detection unit is corresponding to the at least one ineffective area within the screen, the display mode change unit changes relative visibility of the display mode of the at least one effective area and the display mode of the at least one ineffective area during the period extending for a specified interval after the touch operation has ceased.

8. The electronic device of claim 1, wherein the display mode change unit changes relative visibility of the display mode of the at least one effective area and the display mode of the at least one ineffective area comprises only of changing the display mode of the operation information displayed in the at least one effective area.

9. The electronic device of claim 1, wherein the display mode change unit changes relative visibility of the display mode of the at least one effective area and the display mode of the at least one ineffective area comprises of changing the display mode of screen elements other than the operation information displayed in the at least one effective area while maintaining unchanged the display mode of the operation information displayed in the at least one effective area.

10. A method of screen display and touch input, comprising:
  displaying operation information on a user's operations in at least one effective area within a screen of a screen display unit;
  distinguishing the at least one effective area from at least one ineffective area within the screen;
  accepting the user's tactile touch operation upon a screen of the screen display unit;
  detecting the touch location of the touch operation within the screen, upon acceptance of a touch operation through the touch input unit;
  changing relative visibility of the display mode of the at least one effective area and the display mode of the at least one ineffective area within the screen, if the touch location detected by the touch location detection unit is determined to be corresponding to the at least one ineffective area within the screen; and
  storing each of the user's tactile touch operation upon the screen of the screen display unit in a frequency table in a memory unit, and
  changing of relative visibility of the display mode of the at least one effective area and the display mode of the at least one ineffective area comprises at least one effective area and the operation information displayed in the at least one effective area corresponding to relatively frequently used operations for the user becoming subject to an accentuated display with increased priority.

11. A computer program product in a non-transitory computer-readable storage medium for screen display and touch input, comprising machine-readable code for causing a machine to perform the method steps of:
  displaying operation information on a user's operations in at least one effective area within a screen of a screen display unit;
  distinguishing the at least one effective area from at least one ineffective area within the screen;
  accepting the user's tactile touch operation upon a screen of the screen display unit;
  detecting the touch location of the touch operation within the screen, upon acceptance of a touch operation through the touch input unit;
  changing relative visibility of the display mode of the at least one effective area and the display mode of the at least one ineffective area within the screen, if the touch location detected by the touch location detection unit is determined to be corresponding to the at least one ineffective area within the screen and
  storing each of the user's tactile touch operation upon the screen of the screen display unit in a frequency, table in a memory unit, and
  changing of relative visibility of the display mode of the at least one effective area and the display mode of the at least one ineffective area comprises at least one effective area and the operation information displayed in the at least one effective area corresponding to relatively frequently used operations for the user becoming subject to an accentuated display with increased priority.

12. The electronic device of claim 1, wherein the display mode change unit changing relative visibility of the display mode of the at least one effective area and the display mode of the at least one ineffective area comprises displaying more prominently a subset of the at least one effective area and the operation information displayed in the at least one effective area corresponding to at least one operation that is valid in operation context.

13. The electronic device of claim 1, further comprising an image control unit, wherein each of the user's tactile touch operation upon the screen of the screen display unit comprises the user's image processing and postprocessing specification values received by the image control unit for the user's job.

14. The method of claim 10, wherein, upon determining the touch location detected by the touch location detection unit is corresponding to the at least one ineffective area within the screen, the display mode change unit changes relative visibility of the display mode of the at least one effective area and the display mode of the at least one ineffective area during the period extending for a specified interval after the touch operation has ceased.

15. The method of claim 10, wherein the display mode change unit changing relative visibility of the display mode of the at least one effective area and the display mode of the at least one ineffective area comprises displaying more prominently a subset of the at least one effective area and the operation information displayed in the at least one effective area corresponding to at least one operation that is valid in operation context.

16. The computer program product of claim 11, wherein, upon determining the touch location detected by the touch location detection unit is corresponding to the at least one ineffective area within the screen, the display mode change unit changes relative visibility of the display mode of the at least one effective area and the display mode of the at least one ineffective area during the period extending for a specified interval after the touch operation has ceased.

17. The computer program product of claim 11, wherein the display mode change unit changing relative visibility of the display mode of the at least one effective area and the display mode of the at least one ineffective area comprises displaying more prominently a subset of the at least one effective area and the operation information displayed in the at least one effective area corresponding to at least one operation that is valid in operation context.

* * * * *